Oct. 27, 1931.  R. B. GRAY  1,829,396
WINDSHIELD WIPING MECHANISM
Filed Dec. 3, 1928  2 Sheets-Sheet 1
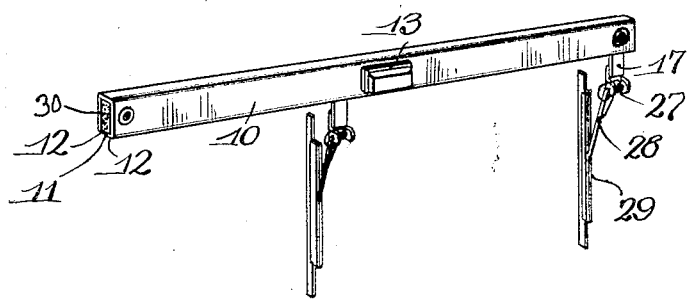
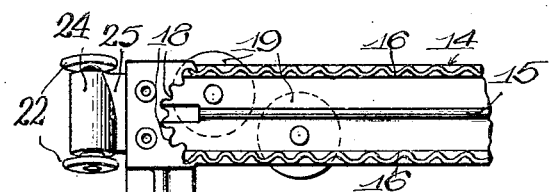
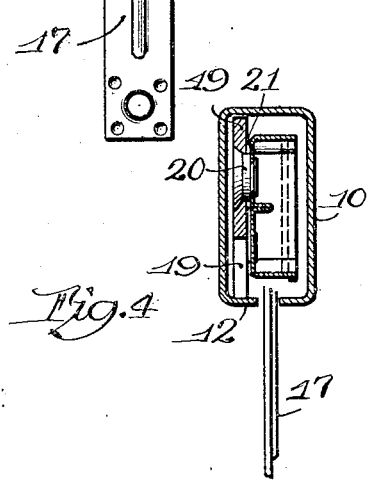
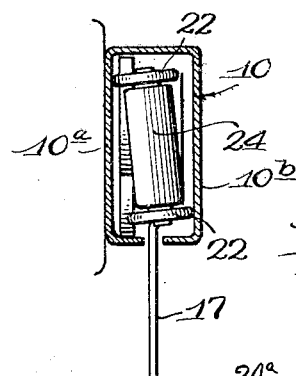
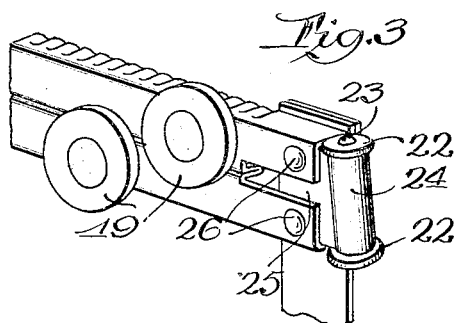
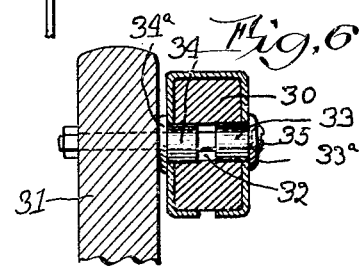
Inventor,
RALPH B. GRAY
By M. F. Cargill Atty.

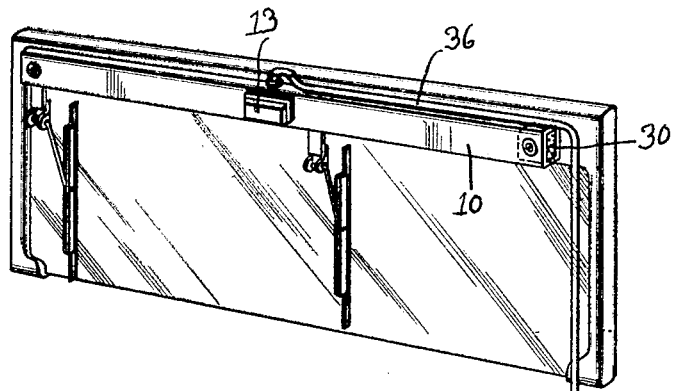
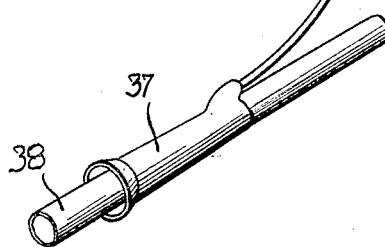
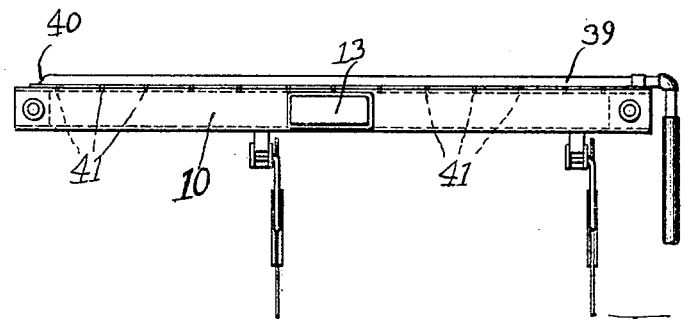

Patented Oct. 27, 1931

1,829,396

UNITED STATES PATENT OFFICE

RALPH B. GRAY, OF CHICAGO, ILLINOIS

WINDSHIELD WIPING MECHANISM

Application filed December 3, 1928. Serial No. 323,276.

This invention relates to improvements in wind shield wiping mechanism.

The principal object of the invention is to provide reciprocating mechanism which will operate freely in the casing, and is provided with means to prevent binding, thereby insuring the uniform operation of the same. The present invention is an improvement over my copending application serial Number 250,431, filed January 30th, 1928, now Patent No. 1,725,860, granted August 27, 1929.

Another object of the invention is to provide a wind shield wiping mechanism casing having sound deading means to quiet the operation thereof.

A further object is to provide means for supplying heat to the mechanism and to the wind shield to insure efficient operation during cold weather.

Other objects relate to various features of construction and arrangement of parts which will be apparent from a consideration of the following specification and accompanying drawings.

In the drawings Fig. 1 is a perspective view of the wiping mechanism.

Fig. 2 is an enlarged detail of the slide member which operates in an elongated casing shown in Fig. 1.

Fig. 3 is a detailed view of the opposite end of the slide.

Fig. 4 is a transverse sectional view through the casing and slide member.

Fig. 5 is an end view of the apparatus.

Fig. 6 is a sectional view through the casing illustrating the sound absorbing construction and means for mounting the casing to a wind shield frame.

Fig. 7 is a broken view illustrating one form of heating arrangement for supplying heat to the wind shield through the wiping mechanism.

Fig. 8 is a modification thereof.

As shown in Fig. 1 the outer casing 10, which is adapted to be secured to the forward side of the wind shield, is rectangular in cross section, having a longitudinal slot 11 along its lower side, thus forming a flange or track 12. A motor 13 is secured to the casing 10 for operating the mechanism. The motor operated member comprises a slide indicated generally by the numeral 14, and is preferably formed of sheet metal. The slide 14 has an integral longitudinal rib 15 which terminates short of the member 15. The member 14 also has its parallel flanges 16 corrugated to form rack bars which mesh alternately with a pinion, not shown, which is driven by the motor 13 for reciprocating the slide. At each end of the slide 14 is secured an arm 17, the arm being of double thicknes where it overlies the end of the slide as shown in Fig. 3. The double portion of the arm is provided with teeth 18 which unite the rack bars at their adjacent ends, whereby the slide 14 is continuously reciprocated by the motor 13, as described more in detail in the application before mentioned.

Secured to the side of the slide 14 opposite the rack 16 are two pairs of rollers 19, one pair being adjacent to each end of the slide. The rollers of each pair as shown in Figs. 2 and 3, are in different horizontal planes, the periphery of one roller extending above the top of slide 14, and the other roller of the pair extending beneath the lower edge of the slide. The lower rollers 19 travel along the lower surface of casing 10 on one stroke of slide 14 while upper rollers 19 travel along the upper wall of the casing only on the reverse stroke of the slide, sufficient clearance being provided for this purpose.

The rollers preferably are secured to the slide 14 by means of rivets 20 having tapered heads as shown in Fig. 4, thin fiber washers 21 being disposed between the rollers and the adjacent wall of the slide 14.

At each end of the slide additional antifriction means are provided in the form of small rollers 22, each pair being carried on a pin 23 which is mounted in a sleeve 24 having extensions 25 which are brought together and are secured by the rivets 26 which secure the arms 17 in place. As shown in Fig. 5 the sleeve 24 is disposed slightly out of the plane of the slide 14, whereby the periphery of the upper roller 22 will bear against the rear side 10a of the casing 10 while the lower roller 22 will bear against the forward side 10b of the casing 10. This angularity of the sleeve 24 is such that when the arms 17 are in a substantially vertical position the rollers 22 bear against the respective side walls of the casing 10, and the rollers 19 are in a substantially vertical position. It may thus be seen that the slide member 14 can easily operate back and forth in the casing 10 without likelihood of binding, the rollers in each instance having a diameter less than the distance between the walls of the casing within which they travel. To the arms 17 are secured clips 27 which carry the arms 28 to which the wiping elements 29 are secured. The slide member 14, as in the patent before referred to, is designed to travel back and forth in the casing 10 a sufficient distance to enable the two wiping elements, one carried at each end of the slide, to clean a band substantially the entire width of the wind shield.

In the ends of the casing 10 rubber plugs 30 preferably are provided which act somewhat as sound deadeners and lessen the noise of operation. To provide a resilient mounting for the casing against the frame members 31 of the wind shield, an opening 32 is formed in each plug 30 which registers with front and rear openings in the casing 10. In these openings are inserted resilient sleeves 33, 34, having end flanges 33a, 34a respectively of a greater diameter than the openings in the casing 10. A bolt 35 passes through the sleeves 33, 34, and through the frame 31 for securing the casing in position. The flanges 34a form a resilient backing for the casing 10 and eliminate rattling while the outer flanges 33a cushion the heads of the bolts.

In Fig. 7 the casing is shown in communication with a pipe or tube 36 which is supplied with heat from any suitable source as from the hot air heater 37 of any conventional type which may be mounted on the exhaust pipe 38. The action of the motor fan (not shown) drives air into the heater and through the tube 36 to the casing 10. The reciprocating parts of the mechanism fan the heated air back and forth to some extent and it will pass from the casing through the slot in the lower wall thereof, whereby the wind shield will be warmed sufficiently to permit the proper functioning of the wiping apparatus.

In Fig. 8 the casing 10 is shown provided with a tube or pipe 39 which may extend from a suitable heater such as that shown in Fig. 7 and passes along substantially the entire length of the casing 10 and is secured thereto by any approved means. The end 40 of the pipe is closed and the heated air is admitted to the interior of the casing 10 through small holes 41 provided in the tube 39 and in the casing 10. During the forward movement of the vehicle the air will be forced against the wind shield and serve to keep it free from snow and ice.

Although I have shown and described certain features of my improvements in detail I do not wish to be restricted specifically thereto except where limitations thereto appear in the appended claims.

I claim:

1. Wind shield wiping mechanism comprising a hollow casing rectangular in cross section, a reciprocal member in said casing adapted to carry a wind shield wiping element, means for actuating said member, and antifriction means on said member for bearing against each wall of said casing, said antifriction means being arranged in sets, one set adjacent each end of said reciprocal member comprising a pair of vertical rollers secured at one side of said member, one roller being arranged to bear against the bottom wall of said casing and the other against the top wall thereof.

2. Wind shield wiping mechanism comprising a hollow casing rectangular in cross section, a reciprocal member in said casing adapted to carry a wind shield wiping element, means for actuating said member, and antifriction means on said member for bearing against each wall of said casing, said antifriction means being arranged in sets, one adjacent each end of said reciprocal member, each set comprising a pair of vertical rollers arranged to bear against opposite horizontal walls of the casing and a second pair of rollers arranged to bear on opposite vertical walls thereof.

3. Wind shield wiping mechanism comprising a hollow casing rectangular in cross section, a reciprocal member in said casing adapted to carry a wind shield wiping element, means for actuating said member, and antifriction means on said member for bearing against each wall of said casing, said antifriction means being arranged in sets, one adjacent each end of said reciprocal member, each set comprising a pair of vertical rollers arranged to bear against opposite horizontal walls of the casing and a second pair of rollers arranged to bear on opposite vertical walls thereof, said last named rollers being mounted on a common axis inclined slightly to the plane of said reciprocal member and being positioned beyond the end of the latter.

4. Wind shield wiping mechanism comprising a hollow elongated casing adapted to be secured to the forward side of a wind shield, said casing being rectangular in cross section and having a longitudinal slot in one wall thereof, a reciprocal member in said casing, means for actuating said member, one or more wiper carrying arms secured to said member and extending through said slot, a pair of vertical rollers at each end of said members, the rollers of each pair being adapted to bear against oposite horizontal side walls of said casing and serving to space said reciprocal member therefrom, and a second pair of rollers at each end of said member, each arranged to bear against opposite vertical walls of said casing and serving to space said reciprocal member from said vertical walls.

5. Wind shield wiping mechanism comprising a hollow elongated casing adapted to be secured to the forward side of a wind shield, said casing being rectangular in cross section and having a longitudinal slot in one wall thereof, a reciprocal member in said casing, means for actuating said member, one or more wiper carrying arms secured to said member and extending through said slot, a pair of vertical rollers at each end of said member, the rollers of each pair being arranged to bear against opposite horizontal side walls of said casing and serving to space said reciprocal member therefrom, and a second pair of rollers at each end of said member, each arranged to bear against opposite vertical walls of said casing and serving to space said reciprocable member from said vertical walls, the rollers of each of said second sets being arranged on a common axis and being disposed outwardly of the respective end of said reciprocal member.

6. Wind shield wiping mechanism comprising a hollow casing rectangular in cross section and having a longitudinal slot in one wall thereof, a reciprocable member in said casing, means for actuating said member, a pair of rollers adjacent each end of said member arranged to bear against opposite horizontal walls of said casing and to space said member therefrom, a bracket secured to each end of said reciprocable member, a pintle carried by each bracket at an angle with respect to the vertical plane of said reciprocable member, a second pair of rollers at each end of said member, the rollers of each of said second pairs being mounted on opposite ends of the respective pintle, whereby said rollers will contact with opposite vertical walls of said casing and space said reciprocable member therefrom, wiper arms secured to the ends of said reciprocable member and extending through said slot, and spring pressed wipers secured to said arms and bearing against the wind shield.

7. Wind shield wiping mechanism comprising a hollow casing adapted to be secured to a wind shield, said casing being rectangular in cross section and having a longitudinal slot in one wall thereof, a reciprocable member in said casing having wiper arms extending through said slot, means for actuating said member, antifriction means at each end of said member for bearing against the four walls of said casing and supporting said reciprocable member in spaced relation with respect to said walls, and vibration absorbing means in said casing to quiet the operation of said mechanism.

8. Wind shield wiping mechanism comprising a hollow casing adapted to be secured to a wind shield, said casing being rectangular in cross section and having a longitudinal slot in one wall thereof, a reciprocable member in said casing having wiper arms extending through said slot, means for actuating said member, antifriction means at each end of said member bearing against the four walls of said casing and supporting said reciprocable member in spaced relation with respect to said walls, and vibration absorbing means in said casing to quiet the operation of said mechanism, said vibration absorbing means comprising rubber plugs inserted in the ends of said casing out of the range of movement of said reciprocable member.

9. A hollow wind shield wiper casing adapted to be secured to a wind shield frame, resilient plugs on the ends of said casing, said plugs and casing having registering openings, flanged rubber sleeves inserted in said opening, one from each side of the casing, the flanges of said sleeves overlying the walls of the casing adjacent said openings, and a bolt extending through each of said openings for securing the casing to the frame, the outer of said flanges cushioning the heads of the bolts and the inner flanges spacing the casing from the frame.

10. In combination, a wind shield wiper casing having closed ends and an open slot along its lower side, said casing being adapted to be secured adjacent the upper portion of a wind shield of a vehicle, means for conveying heated air to said casing, and reciprocable means in said casing serving to distribute the heated air therein for emission through said slot.

In witness whereof I have subscribed my name.

RALPH B. GRAY.